United States Patent
Rottinghaus

(10) Patent No.: US 7,441,986 B2
(45) Date of Patent: Oct. 28, 2008

(54) GROUND HEATING DEVICE

(76) Inventor: Vince Rottinghaus, 1155 170th St., Charles City, IA (US) 50616

( * ) Notice: Subject to any disclaimer, the term of this patent is extended or adjusted under 35 U.S.C. 154(b) by 74 days.

(21) Appl. No.: 11/307,258

(22) Filed: Jan. 30, 2006

(65) Prior Publication Data

US 2007/0177856 A1 Aug. 2, 2007

(51) Int. Cl.
*E01C 23/14* (2006.01)
(52) U.S. Cl. .................. 404/71; 404/95; 237/12.3 B
(58) Field of Classification Search ............ 404/71, 404/95; 237/12.3 B
See application file for complete search history.

(56) References Cited

U.S. PATENT DOCUMENTS

| | | | | |
|---|---|---|---|---|
| 2,139,484 | A | * | 12/1938 | Baird .................. 242/388.8 |
| 3,380,658 | A | * | 4/1968 | Stasz et al. .................. 239/130 |
| 4,124,039 | A | * | 11/1978 | St. Laurent ............... 138/35 |
| 4,986,311 | A | * | 1/1991 | Mikkelson ................. 138/353 |
| 5,181,655 | A | * | 1/1993 | Bruckelmyer .............. 237/1 R |
| 5,838,880 | A | | 11/1998 | Brooks, Jr. et al. |
| 5,964,402 | A | * | 10/1999 | Jakobson ................... 237/69 |
| 6,041,821 | A | * | 3/2000 | Grossman ................... 138/33 |
| 6,126,081 | A | | 10/2000 | Calvin et al. |
| 6,227,453 | B1 | | 5/2001 | Calvin et al. |
| 6,325,297 | B1 | | 12/2001 | Calvin et al. |
| 6,397,883 | B1 | * | 6/2002 | Huntley et al. ............ 137/382 |
| 6,761,135 | B1 | * | 7/2004 | Becktold .................. 122/396 |
| 2005/0017117 | A1 | * | 1/2005 | Moon et al. .............. 242/390.8 |

* cited by examiner

*Primary Examiner*—Gary S Hartmann

(57) ABSTRACT

A ground heating device is provided for thawing frozen ground. A water heater is provided with a reservoir tank in fluid communication with the water heater. A pump is provided in fluid communication with the reservoir tank. A hose is provided in fluid communication with both the pump and the reservoir tank. Additionally, the ground heating device includes a spool for winding the hose. In this arrangement, the water heater maintains hot water in the reservoir tank, and the pump circulates the hot water from the reservoir tank, through the hose, and back into the reservoir tank. The hot water thaws the frozen ground that is proximate to the hose.

5 Claims, 3 Drawing Sheets

GROUND HEATING DEVICE

BACKGROUND OF THE INVENTION

The present invention relates to a boiler system and, more specifically, a ground heating device that utilizes hot water to thaw the surface of frozen ground.

In those parts of the world that experience the winter season, the colder weather substantially freezes the ground, particularly the surface of the ground and the immediate underlying layers. While planned construction generally tapers during the winter season, some construction, such as emergency road work and the reparation of water and gas lines, must continue. Excavation of frozen ground can be difficult, even for heavy machinery. Additionally, concrete is not likely to properly set and cure when poured on frozen ground.

Several ground heating devices have been developed that work to thaw the frozen ground prior to excavation and construction. For example, U.S. Pat. No. 5,838,880 by Brooks, Jr. et al discloses a ground heating system that includes an internal combustion engine and a ground-engaging heat exchanger. Waste heat from the internal combustion engine is pumped into the heat exchanger, which radiates heat to thaw the surrounding frozen ground. While the Brooks, Jr. et al device efficiently warms the ground, it requires a complicated and expensive heat exchanger that must be driven into the frozen ground.

U.S. Pat. Nos. 6,126,081, 6,227,453, and 6,325,297 all by Calvin et al. disclose atmospheric liquid heaters that use manifolds and a plurality of hoses to provide radiant heat to thaw the frozen ground. Specifically, the Calvin et al. devices have pumps that circulate water from a reservoir tank into a liquid heater and then through a plurality of hoses via a plurality of manifolds. An operator spreads the hoses across the frozen ground, and the hot water passing through the hoses generates radiant heat that thaws the frozen ground. While the Calvin et al. devices do not require the use of complicated and expensive heat exchangers as disclosed in the Brooks, Jr. et al. reference, the Calvin et al. devices require considerable setup time to hook up and position all of the hoses. Additionally, the Calvin et al. devices do not provide for a quick and easy way to reel in the hoses after use. An operator must lay the hose out once extended so that it may be retracted onto the spool. This process is time consuming and labor intensive.

It is therefore a principal object of this invention to allow for the quick and easy setup and disassembly of a ground heating device, thereby minimizing the time necessary to thaw frozen ground.

These and other objects will be apparent to those skilled in the art.

BRIEF SUMMARY OF THE INVENTION

The present invention is directed towards a ground heating device for thawing frozen ground. A water heater is provided with a reservoir tank in fluid communication with the water heater. A pump is provided in fluid communication with the reservoir tank. A hose is provided in fluid communication with both the pump and the reservoir tank. Additionally, the ground heating device includes a spool for winding the hose. In this arrangement, the water heater maintains hot water in the reservoir tank, and the pump circulates the hot water from the reservoir tank, through the hose, and back into the reservoir tank. The hot water thaws the frozen ground that is proximate to the hose.

DESCRIPTION OF THE PREFERRED EMBODIMENTS OF THE INVENTION

Figure 1:
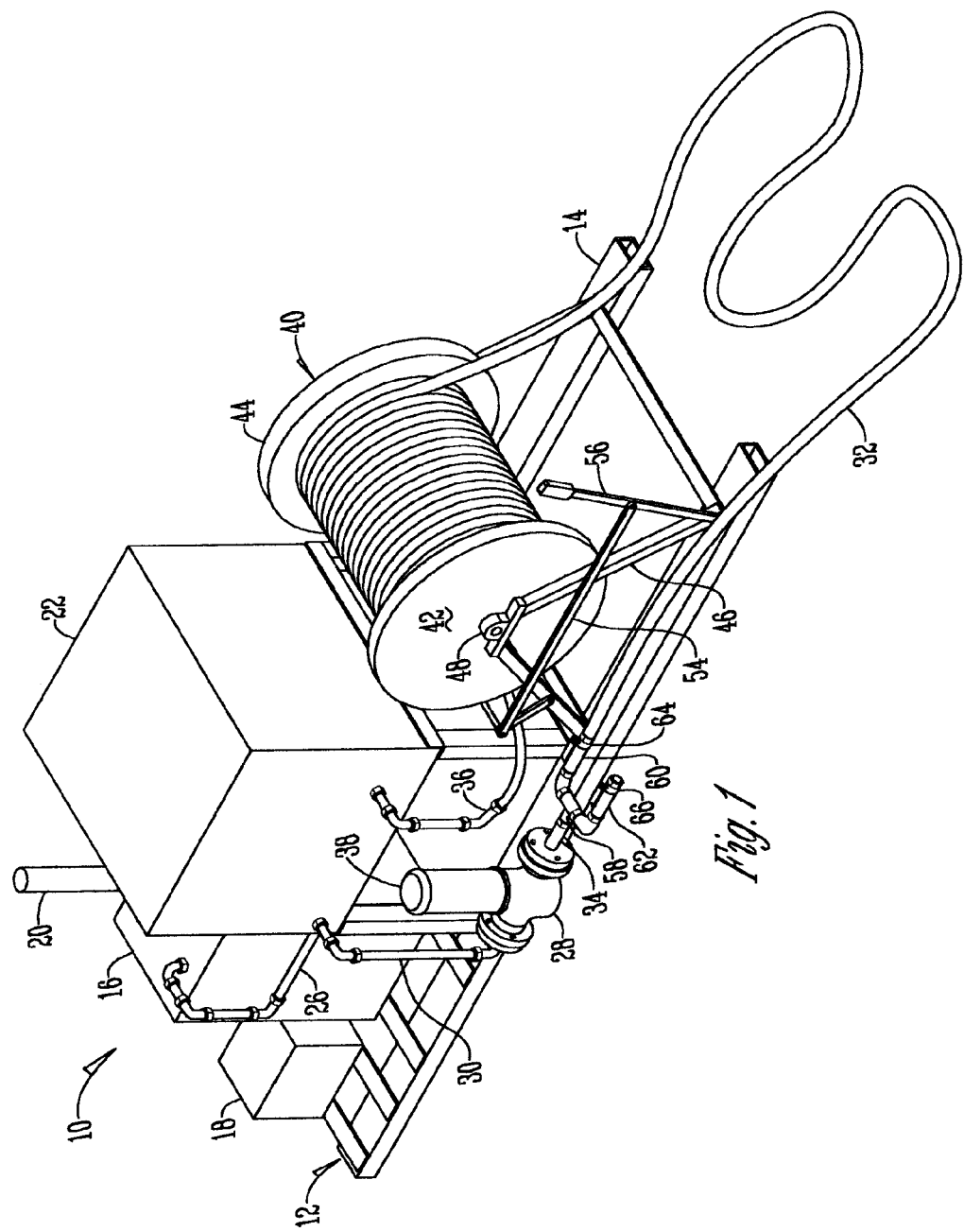
FIG. 1 is perspective view of the ground heating device of the present invention.
Figure 2:
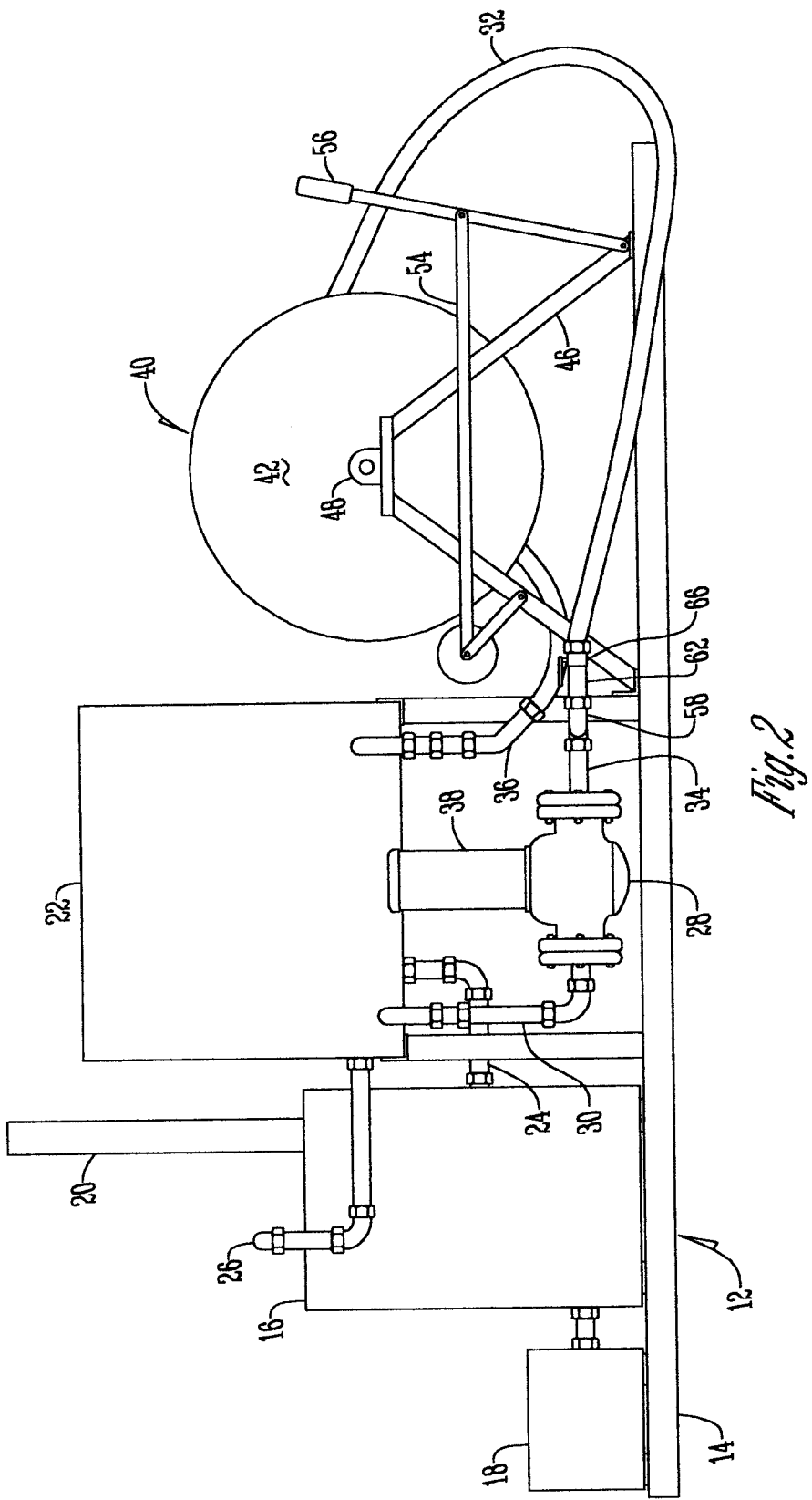
FIG. 2 is a side view of the ground heating device of the present invention.

With reference to the drawings, a ground heating device 10 is provided. The ground heating device 10 comprises a frame 12 upon which the individual components of the ground heating device 10 are mounted. Frame 12 includes tubular members 14 which are capable of receiving fork lift arms. Preferably, tubular members have a rectangular cross section measuring approximately four by six inches.

Water heater 16 is mounted toward one end of frame 12. Water heater 16 preferably comprises an oil-fueled burner and electric-powered blower. Alternatively, water heater 16 comprises a gas or propane-fueled burner. Water heater 16 draws oil or other fuel from fuel tank 18. Exhaust from water heater 16 is passed through exhaust stack 20. Preferably, water heater 16 heats water passing therein to a temperature of approximately 180° F.

Reservoir tank 22 is mounted centrally on the frame 12. Reservoir tank 22 is in fluid communication with water heater 16 via conduits 24 and 26. Specifically, water from the reservoir tank 22 is drawn into the water heater 16 via conduit 24. After passing through water heater 16, hot water is returned to the reservoir tank 22 via conduit 26.

Pump 28 circulates water throughout the ground heating device 10. Specifically, pump 28 draws hot water from the reservoir tank 22 via conduit 30 and pumps the water to hose 32 via conduit 34. Hose 32 creates a closed circuit between conduits 34 and 36 such that the pump 28 pumps the water through hose 32 and back to reservoir tank 22 via conduit 36. Pump 28 preferably is a centrifugal type pump and is driven by electric motor 38. The centrifugal pump meters a desired amount of fluid with every revolution as compared with a positive displacement pump.

Spool 40 is mounted on an end of frame 12 opposite from the water heater 16. Spool 40 has ends 42 and 44. End 44 is greater in width than end 42. Preferably, end 44 is about three inches in width. Spool 40 is supported by rack 46 and rotates about rack 46 via bearings 48. In this arrangement, spool 40 rotates about bearings 48 to reel in or unravel hose 32.

Friction wheel 50 is positioned for selective engagement with spool 40 to drive spool 40 for reeling in hose 32. Friction wheel 50 is powered by electric motor 52 that is mounted on a linkage 54 that allows for selective engagement of the friction wheel 50 with the spool 40. Linkage 54 is connected to a handle 56 that is positioned generally in alignment with end 42 of the spool 40 for easy access by an operator. When the operator pulls the handle 56 in a direction away from the device 10, linkage 54 rotates toward the end 44 of the spool such that the friction wheel 50 drivingly engages end 44 of spool 40. Accordingly, friction wheel 50, driven by electric motor 52, drives spool 40, thereby reeling in hose 32. By releasing handle 56, friction wheel 50 is disengaged with spool 40, thereby stopping rotation of the spool 40.

Figure 3:
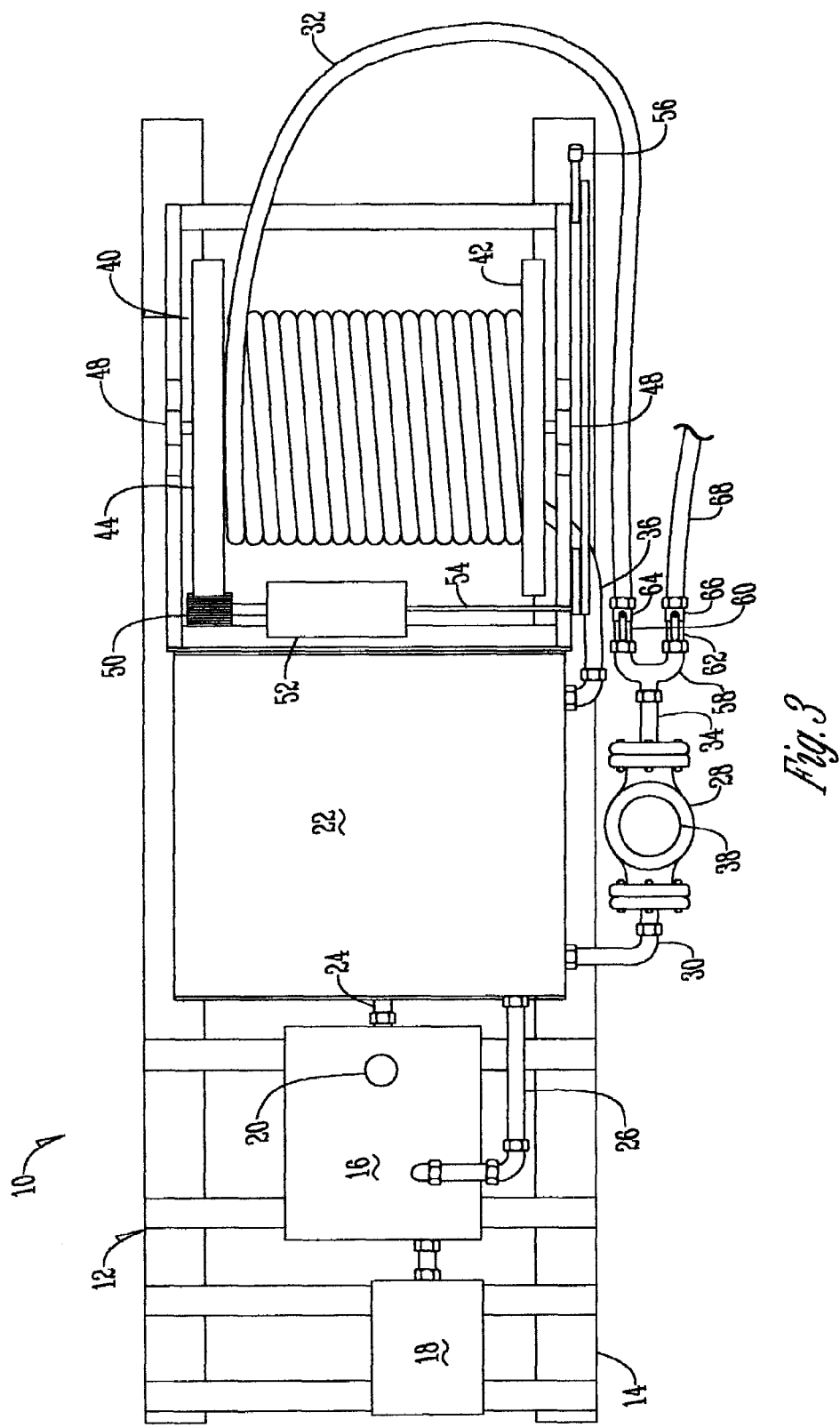
FIG. 3 is a plan view of the ground heating device of the present invention.

Hose 32 is connected to conduits 34 and 36. As best shown in FIG. 3, conduit 34 includes a tee section 58, which is connected to legs 60 and 62. Check valves 64 and 66 are attached to legs 60 and 62, respectively to allow for selective closure of each leg 60, 62. In this arrangement, hose 32 is connected to conduit 34 via either leg 60 or 62. Hose 32 is preferably 1500 feet in length and is durable enough to withstand the hot temperature of the water pumped therein. Because of the tee section 58, a second hose 68 may be attached, as shown in FIG. 3 when additional coverage area is needed. Specifically, first hose 32 is attached to leg 60 and second hose 68 is attached to leg 62, thereby allowing for a greater surface area of ground to be heated by the ground heating device 10.

In operation, the operator unravels hose 32 from spool 40 and spreads the hose 32 about the portion of frozen ground to be thawed. The operator then powers the water heater 16 to heat the water within the reservoir tank 22 to the desired temperature, preferably 180° F. The operator then powers the pump 28, which draws the hot water from the reservoir tank 22 and pumps the water through conduit 30 to hose 32 through conduit 34. The hose 32 creates a closed circuit between conduits 34 and 36 and pump 28 pumps water through hose 32 where the water returns to the reservoir tank 22 through conduit 36. In this manner, water is heated in the water heater 16, transferred to reservoir tank 22, and then circulated throughout the ground heating device 10, especially the hose 32, via pump 28. As hot water passes through the hose 32, radiant heat thaws the surrounding frozen ground.

After the ground has been thawed, the operator shuts down the water heater 16 and pump 28. The operator reels in the hose 32 about spool 40 via friction wheel 50. Specifically, the operator switches on motor 52 and pulls handle 56, which draws the friction wheel with end 44 of the spool 40 via linkage 54. Friction wheel 50, which is rotatably driven by electric motor 52, drivingly engages spool 40, which rotates spool 40 such that hose 32 is retracted in and around spool 40. By releasing the handle 56, the friction wheel 50 disengages end 44 and the rotation of the spool 40 is discontinued.

The ground heating device 10 preferably is housed in a covered trailer (not shown). In this arrangement, the ground heating device 10 may be towed to any construction site. Because the ground heating device 10 is secured to the frame 12 with tubular members 14, the ground heating device 10 may be removed from the trailer via a fork lift during warmer months when ground thawing is not needed. This allows the trailer to be used for other needs. Specifically, the tubular members 14 are sized to receive fork lift arms such that a fork lift truck may lift and move the ground heating device 10 to another location. In this manner, the ground heating device 10 may be placed in a storage site during the warmer months of the year and then transferred to a trailer for use during the winter season.

It is therefore seen that by the use of a hose directly connected to a pump and reeled about a driven spool, this invention allows for quick and easy setup and disassembly, thereby minimizing the time necessary to thaw frozen ground.

What is claimed is:

1. A ground heating device comprising:
    a frame;
    a water heater secured to the frame;
    a reservoir tank secured to the frame in fluid communication with the water heater;
    a pump in fluid communication with the reservoir tank;
    a hose in fluid communication with both the pump and the reservoir tank;
    a spool secured to the frame for winding the hose;
    a friction wheel positioned to selectively and drivingly engage the spool;
    linkage supporting the friction wheel for selectively engaging the friction wheel and the spool;
    an electric motor mounted on the linkage and driving the friction wheel; and
    wherein the linkage is connected to a handle such that when an operator pulls the handle in a direction away from the ground heating device the linkage rotates such that the friction wheel drivingly engages the spool.

2. The device of claim 1 further comprising a second hose in fluid communication with the pump and the reservoir tank.

3. The device of claim 1 further comprising a fuel tank in fluid communication with the water heater.

4. The device of claim 1 wherein the frame comprises tubular members for receiving fork lift arms.

5. The device of claim 1 wherein the pump comprises a centrifugal type pump.

* * * * *